US012767055B2

(12) United States Patent
Maeda

(10) Patent No.: US 12,767,055 B2
(45) Date of Patent: Oct. 20, 2026

(54) VEHICLE FRONT STRUCTURE

(71) Applicant: SUBARU CORPORATION, Tokyo (JP)

(72) Inventor: Akihiro Maeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 183 days.

(21) Appl. No.: 18/981,826

(22) Filed: Dec. 16, 2024

(65) Prior Publication Data

US 2025/0115188 A1 Apr. 10, 2025

Related U.S. Application Data

(63) Continuation of application No. PCT/JP2023/018759, filed on May 19, 2023.

(51) Int. Cl.
*B60R 5/02* (2006.01)
*B60R 7/02* (2006.01)
(Continued)

(52) U.S. Cl.
CPC .................. *B60R 5/02* (2013.01); *B60R 7/02* (2013.01); *B62D 25/087* (2013.01);
(Continued)

(58) Field of Classification Search
CPC .. B62D 25/087; B62D 25/082; B62D 25/105; B62D 25/12; B60R 5/02; B60R 5/04;
(Continued)

(56) References Cited

U.S. PATENT DOCUMENTS 3,318,471 A * 5/1967 Barr .......................... B60R 7/10 224/572
11,208,046 B2 * 12/2021 Liu .......................... B60R 5/02
(Continued)

FOREIGN PATENT DOCUMENTS

DE 102019001342 A1 8/2020
JP 5992974 B2 9/2016
JP 2021-146741 A 9/2021

OTHER PUBLICATIONS

International Search Report (with English translation) and Written Opinion dated Jul. 18, 2023, from International Application No. PCT/JP2023/018759, 9 pages.

*Primary Examiner* — Roger L Pang
(74) *Attorney, Agent, or Firm* — Rimon P.C.

(57) ABSTRACT

A vehicle front structure includes a hood, a link mechanism, a frunk, a hood lock, and a frunk lock. The hood is configured to open and close a housing space in which at least a drive motor is disposed. The link mechanism is attached to the hood. The frunk is attached to the link mechanism and accommodated in the housing space in a state where the hood is closed. The hood lock is configured to hold the hood in a closed state. The frunk lock is configured to lock the frunk to the hood. The frunk is configured to move at least in a front-rear direction according to an operation of the link mechanism and is configured to move forward in a state where the hood is open. Locking of the frunk by the frunk lock is released when locking of the hood by the hood lock is released.

9 Claims, 8 Drawing Sheets

(51) Int. Cl.

| | |
|---|---|
| ***B62D 25/08*** | (2006.01) |
| ***B62D 25/10*** | (2006.01) |
| ***B62D 25/12*** | (2006.01) |
| *B60R 11/00* | (2006.01) |

(52) U.S. Cl.
CPC ........... *B62D 25/105* (2013.01); *B62D 25/12* (2013.01); *B60R 2011/0082* (2013.01)

(58) Field of Classification Search
CPC ............... B60R 7/02; B60R 2011/0038; B60R 2011/0082; B60R 2011/0085
USPC ....................................... 296/37.1, 24.45, 76
See application file for complete search history.

(56) References Cited

U.S. PATENT DOCUMENTS

| | | | | |
|---|---|---|---|---|
| 2010/0051662 | A1* | 3/2010 | Hanson ..................... | B60R 9/00<br>224/404 |
| 2021/0284242 | A1 | 9/2021 | Yamaoka | |
| 2024/0136548 | A1* | 4/2024 | Hoshino ................. | F24H 1/009 |
| 2025/0091656 | A1* | 3/2025 | Ryan ......................... | B60R 9/06 |

* cited by examiner

VEHICLE FRONT STRUCTURE

CROSS-REFERENCE TO RELATED APPLICATIONS

This application is continuation of International Application No. PCT/JP2023/018759, filed on May 19, 2023, the entire contents of which are hereby incorporated by reference.

BACKGROUND

The disclosure relates to a technical field of a vehicle front structure in which a frunk is accommodated in a housing space positioned on a front side of a vehicle cabin.

Examples of vehicles such as automobiles include electric vehicles (electric automobiles). In the electric vehicles, a drive motor instead of an engine is accommodated as a driving source in a housing space positioned on a front side of a vehicle cabin, and the electric vehicles are driven by power output from the drive motor. Since the drive motor is desirably positioned close to a wheel (front wheel), the drive motor is accommodated on a back and lower side of the housing space.

Some such electric vehicles include a frunk capable of storing a stored item in a housing space where a drive motor is accommodated (see, for example, Japanese Patent No. 5992974 and Japanese Unexamined Patent Application Publication (JP-A) No. 2021-146741).

SUMMARY

An aspect of the disclosure provides a vehicle front structure. The vehicle front structure includes a hood, a link mechanism, a frunk, a hood lock, and a frunk lock. The hood is configured to open and close a housing space in which at least a drive motor is disposed. The link mechanism is attached to the hood. The frunk is attached to the link mechanism and accommodated in the housing space in a state where the hood is closed. The hood lock is configured to hold the hood in a closed state. The frunk lock is configured to lock the frunk to the hood. The frunk is configured to move at least in a front-rear direction according to an operation of the link mechanism and is configured to move forward in a state where the hood is open. Locking of the frunk by the frunk lock is released when locking of the hood by the hood lock is released.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the vehicle in which the frunk is accommodated in the housing space positioned on a front side of the vehicle cabin as described above, when a drive motor and an auxiliary device, which are high-voltage components, are subjected to impact from the frunk in the event of a collision (frontal collision) of the vehicle, the safety of a passenger and a rescuer may be impaired due to secondary damage such as an electric shock, and thus the frunk may be accommodated on an upper side of the drive motor.

However, when the frunk is accommodated on the upper side of the drive motor, the frunk is positioned on a back side in the housing space. Thus, the position of the frunk is away from the user, which may impair the convenience of loading and unloading the stored item to and from the frunk.

On the other hand, even when the frunk is accommodated on a distal end side of the vehicle, when a bottom surface of the inside of the frunk is positioned on a lower side, the user may be forced to take a posture of bending down or the like when loading and unloading the stored item to and from the frunk. This also impairs the convenience of loading and unloading the stored item to and from the frunk.

Accordingly, in the disclosure, it is desirable to improve the convenience of loading and unloading the stored item to and from the frunk.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

<Schematic Configuration of Vehicle>

Figure 1:
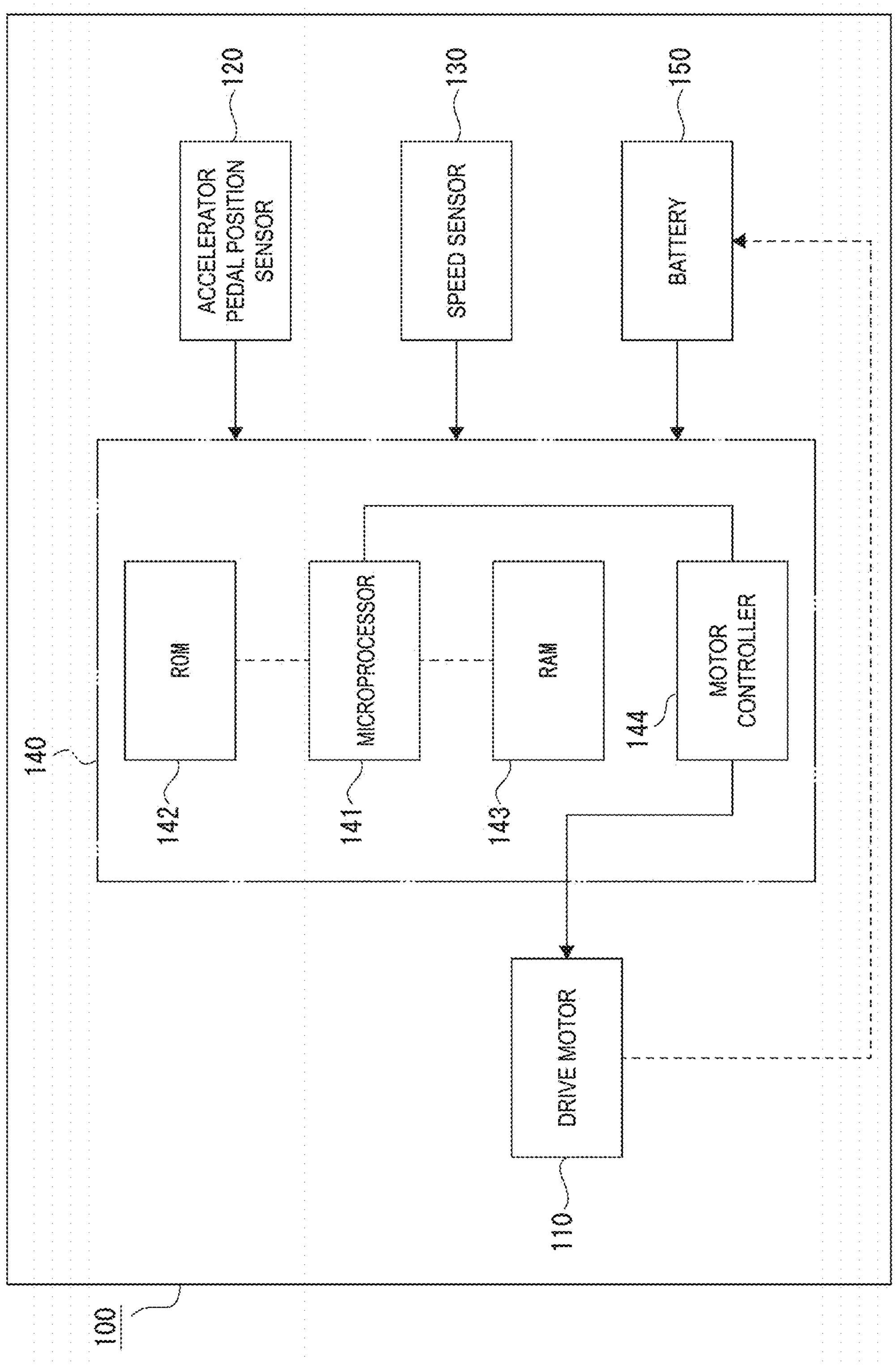
FIG. 1, together with FIGS. 2 to 8, illustrates an embodiment of a vehicle front structure of the disclosure, and is a diagram illustrating a schematic configuration of a vehicle.

First, a schematic configuration of a vehicle will be described (see FIG. 1).

A vehicle 100 is an electric vehicle that travels only by electric power, and includes a drive motor 110, an accelerator pedal position sensor 120, a speed sensor 130, and a controller 140.

The drive motor 110 is accommodated in a space on a front side of a vehicle cabin and is used as a power source of the vehicle 100.

The accelerator pedal position sensor 120 detects an accelerator pedal position corresponding to a driving force of the vehicle 100 requested by a driver who drives the vehicle, that is, a depressed amount of an accelerator pedal by the driver. The accelerator pedal position detected by the accelerator pedal position sensor 120 is output as a detected signal to the controller 140.

The speed sensor 130 detects a speed of the vehicle 100. The speed of the vehicle 100 detected by the speed sensor 130 is output as a detected signal to the controller 140.

In one embodiment, the controller 140 may serve to integrally control an operation of each member in the vehicle 100 and perform various calculation processes. The controller 140 includes a microprocessor 141 performing calculation, a read only memory (ROM) 142 storing a program or the like for causing the microprocessor 141 to execute each process, a random access memory (RAM) 143 storing various data such as calculation results, an interface for inputting or outputting data, and the like.

The controller 140 includes a motor controller 144 controlling the drive motor 110. In one embodiment, the motor controller 144 may serve to control, for example, a driving operation of wheels of the vehicle 100 by the drive motor 110, a regenerative operation in the drive motor 110, and the like.

A battery 150 is accommodated in a trunk room or the like of the vehicle 100. The battery 150 includes a battery module storing electric power used in the vehicle 100, for example, electric power used in the controller 140, each member operated by electric power in the vehicle 100, and various types of lighting provided in the vehicle 100, and the like, in addition to electric power used in the drive motor 110. As a battery of the battery module, for example, a secondary battery such as a nickel hydrogen battery or a lithium ion battery is used. The battery 150 stores, for example, regenerative electric power supplied from the drive motor 110 in addition to electric power (charging electric power) obtained by charging from outside the vehicle 100.

<Vehicle Front Structure and Other Members>

Next, the vehicle front structure and the like will be described (see FIGS. 2 to 6).

Figure 2:
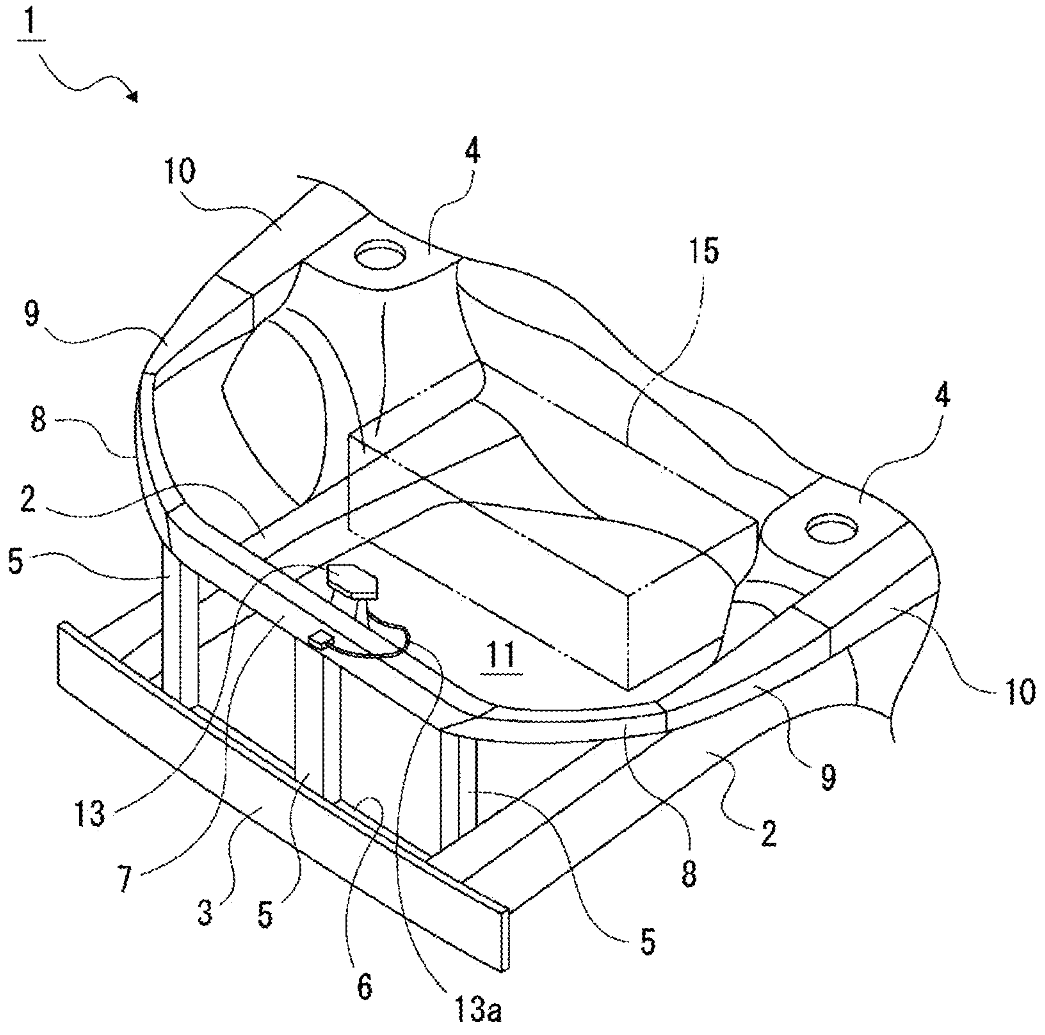
FIG. 2 is a perspective view illustrating a part of the vehicle front structure.
Figure 3:
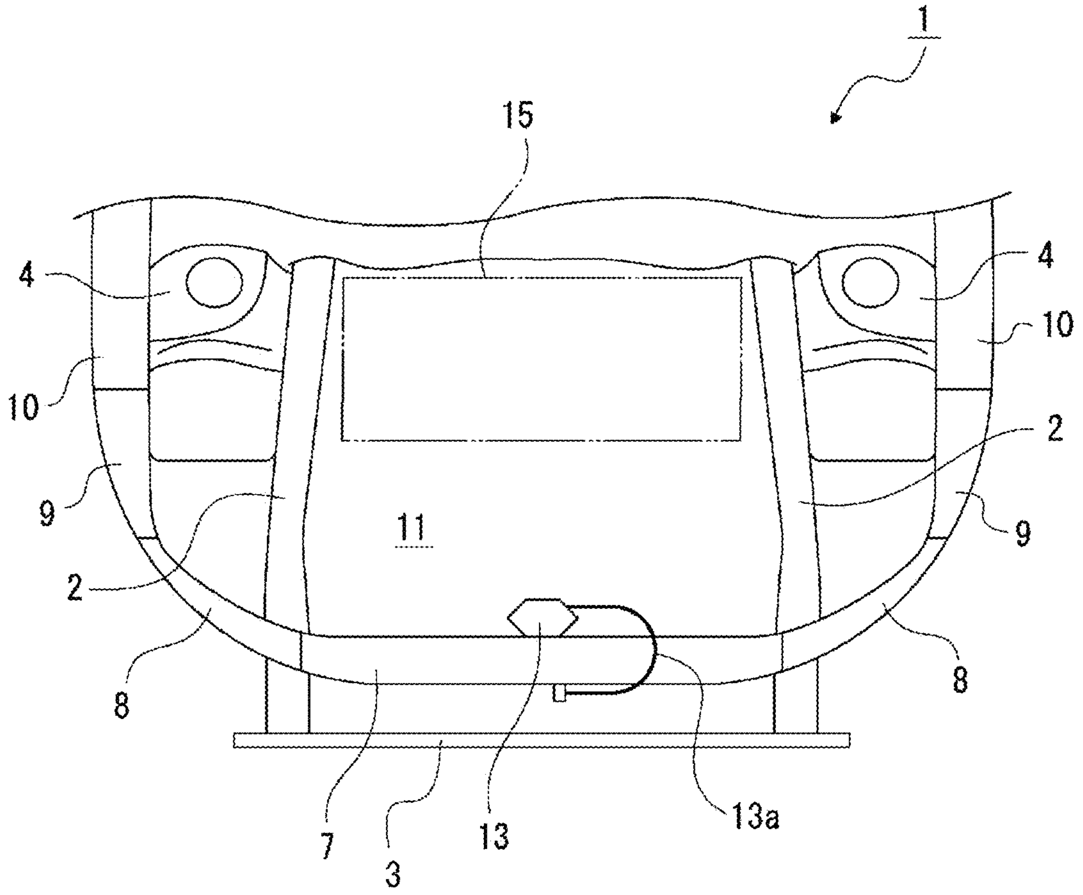
FIG. 3 is a plan view illustrating a part of the vehicle front structure.
Figure 4:
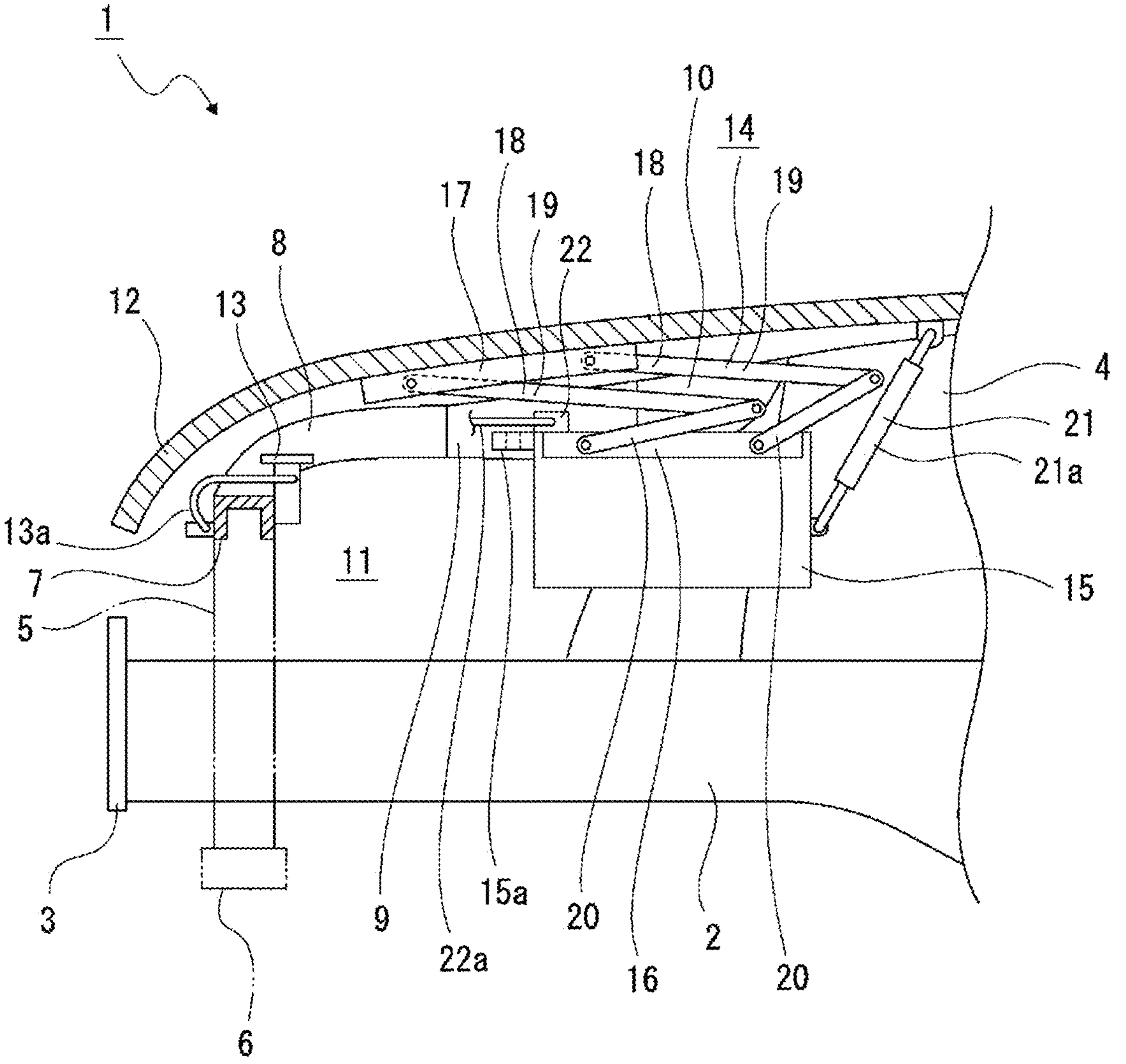
FIG. 4 is a side view illustrating a part of the vehicle front structure.

A vehicle front structure 1 includes a side frame 2, a bumper beam 3, a strut tower 4, and the like (see FIGS. 2 to 4).

A pair of the side frames 2 are provided so as to be spaced apart from each other in the left-right direction and have a shape extending in the front-rear direction. The bumper beam 3 is fastened to a front end of the side frame 2 and has a shape extending in the left-right direction. The strut tower 4 is fastened to an outer side of a rear end of the side frame 2, and has a shape protruding upward from the side frame 2. The strut tower 4 is a portion having high strength and in one embodiment, may serve to protect the vehicle cabin together with the side frame 2 in the event of a collision.

Support members 5 extending up and down are provided on a rear side of the bumper beam 3 so as to be spaced apart from each other in the left-right direction. A lower beam 6 extending in the left-right direction is fastened to lower ends of the support members 5, and an upper support 7 extending in the left-right direction is fastened to upper ends of the support members 5. Both left and right ends of the lower beam 6 may be fastened to portions on the front side of the side frames 2, respectively, or may be fastened to the portions on the front side of the side frames 2, respectively, via other members.

Upper sides 8 are fastened to both left and right ends of the upper support 7, respectively, and the upper sides 8 are inclined so as to be displaced rearward toward the outer side in the left-right direction. An upper frame 9 extending in the front-rear direction is fastened to a rear end of the upper side 8. A coupling frame 10 extending in the front-rear direction is fastened to a rear end of the upper frame 9, and an upper end of the strut tower 4 is fastened to an inner side of the coupling frame 10.

The vehicle front structure 1 includes a housing space 11 surrounded by members such as the side frame 2. The housing space 11 is a space on a lower side of a hood (bonnet) 12, and the drive motor 110 is accommodated in the housing space 11 at a position on a lower side of the side frame 2. The drive motor 110 is accommodated at a position closer to a rear side in the housing space 11.

A radiator (not illustrated) is disposed at a front end of the housing space 11. The radiator may serve as a heat exchanger. The radiator is disposed between the lower beam 6 and the upper support 7 and held by the support members 5.

A hood lock 13 is attached to the upper support 7. In one embodiment, the hood lock 13 may serve to lock the hood 12 in a closed state by being engaged with a first locking engagement member (not illustrated) provided at the hood 12.

The hood lock 13 has a double lock mechanism and is coupled by a hood wire 13*a* to a release lever (not illustrated) provided in the vehicle cabin. Thus, when the release lever is operated, the hood lock 13 is operated via the hood wire 13*a*, and a first locked state with respect to the hood 12 by the hood lock 13 is released. In a state where the first locked state is released, by inserting a finger into a gap existing on a lower side of the hood 12 and operating the hood lock 13, a second locked state with respect to the hood 12 by the hood lock 13 is released, and the hood 12 can be lifted and opened.

A frunk 15 attached to a link mechanism 14 can be accommodated in the housing space 11. For example, the frunk 15 may include only a storage case opened upward, or may include, in addition to the storage case, a lid for opening and closing an opening of the storage case.

The link mechanism 14 is attached to a lower surface of the hood 12, and the frunk 15 attached to the link mechanism 14 can be accommodated on an upper side of the drive motor 110 on a back side in the housing space 11.

The link mechanism 14 includes a left and right pair of frunk attaching members 16, a left and right pair of attached members 17, and arms 18.

The frunk attaching member 16 has a shape extending in the front-rear direction. A side surface of the frunk 15 is attached to the frunk attaching member 16.

The attached member 17 has a shape extending in the front-rear direction and attached to the lower surface of the hood 12.

Two arms 18 are coupled to the frunk attaching member 16 and the attached member 17 in the front-rear direction. Thus, the link mechanism 14 is provided as a parallel link by one frunk attaching member 16, one attached member 17, and two arms 18, and includes a pair of the parallel links each positioned on the left and right.

In the arm 18, a first link 19 and a second link 20 are coupled to each other vertically in a rotatable manner, and a lower end of the first link 19 and an upper end of the second link 20 are coupled to each other. In the arm 18, an upper end of the first link 19 is rotatably coupled to the frunk attached member 17, and a lower end of the second link 20 is rotatably coupled to the frunk attaching member 16.

The frunk 15 is coupled to the hood 12 by a damper 21. The damper 21 is inclined forward and downward and includes a sealing member 21*a* filled with oil or other fluid. A front end of the damper 21 is rotatably coupled to a rear surface of the frunk 15, and a rear end is rotatably coupled to a lower surface of the frunk 15. Since the frunk 15 is coupled to the hood 12 by the damper 21, a force is applied to the frunk 15 in a direction of being moved forward from the damper 21.

The frunk 15 includes a handle 15*a* at a front end and is movable in the front-rear direction and the up-down direction in a horizontal state according to an operation of the link mechanism 14. The frunk 15 is movable between a rearmost housing position (see FIG. 4) and a foremost working position (see FIG. 5) according to the operation of the link mechanism 14. The working position is a position on an upper side of the housing position.

The frunk 15 is moved from the housing position towards the working position when the hood 12 is open. In a state where the frunk 15 is moved to the working position which is a front end in a moving range, the front end of the frunk 15 is positioned rearward of the front end of the hood 12, which is fully opened, and the frunk 15 is entirely positioned rearward of the front end of the hood 12.

A frunk lock 22 is attached to an upper end of the front end of the frunk 15. In one embodiment, the frunk lock 22 may serve to lock the frunk 15 to the hood 12 by being engaged with a second locking engagement member (not illustrated) provided at the hood 12.

In a state where the frunk 15 is locked, the frunk 15 is closest to the hood 12, and an upper surface of the frunk 15 is positioned opposite the lower surface of the hood 12 (see FIG. 4). The frunk 15 is accommodated in the housing position in a state where the frunk 15 is locked by the frunk lock 22.

The frunk lock 22 is coupled to the hood lock 13 or the hood wire 13*a* by the frunk wire 22*a*, and is operated in association with the operation of the hood lock 13 when the hood lock 13 is manually operated in a state where the first locked state with respect to the hood 12 by the hood lock 13 is released. When the frunk lock 22 is operated in association with the operation of the hood lock 13, the locked state of the frunk 15 with respect to the hood 12 by the frunk lock 22 is released.

Thus, when a finger is inserted into the gap existing on the lower side of the hood 12 and the second locked state with respect to the hood 12 by the hood lock 13 is released, the locked state of the frunk 15 with respect to the hood 12 by the frunk lock 22 is released at the same time.

Locking of the frunk 15 to the hood 12 by the frunk lock 22 is performed by engaging the frunk lock 22 with the second locking engagement member when the frunk 15 is manually lifted and brought close to the hood 12 in the state where the hood 12 is open.

In the vehicle 100, when the hood 12 is locked in the closed state by the hood lock 13, the frunk 15 is locked to the hood 12 by the frunk lock 22 and held at the housing position (see FIG. 4). When the frunk 15 is held at the housing position, the first link 19 and the second link 20 of the arm 18 are in a state of being bent at a predetermined angle with a coupling portion between the first link 19 and the second link 20 as a fulcrum.

When the operator (passenger) operates the release lever to release the first locked state of the hood 12, and then manually operates the hood lock 13 to release the second locked state with respect to the hood 12 by the hood lock 13, the locked state of the frunk 15 with respect to the hood 12 by the frunk lock 22 is released at the same time.

Subsequently, when the operator opens the hood 12, the link mechanism 14 and the frunk 15 are moved upward in association with the hood 12. However, since the locked state of the frunk 15 with respect to the hood 12 has been released, the arm 18 of the link mechanism 14 is rotated by the weight of the link mechanism 14 and the frunk 15, and the frunk 15 is moved, for example, relatively downward with respect to the hood 12 in a parallel state. When the frunk 15 is moved relatively downward with respect to the hood 12, the frunk 15 is pushed out forward by the damper 21.

Figure 5:
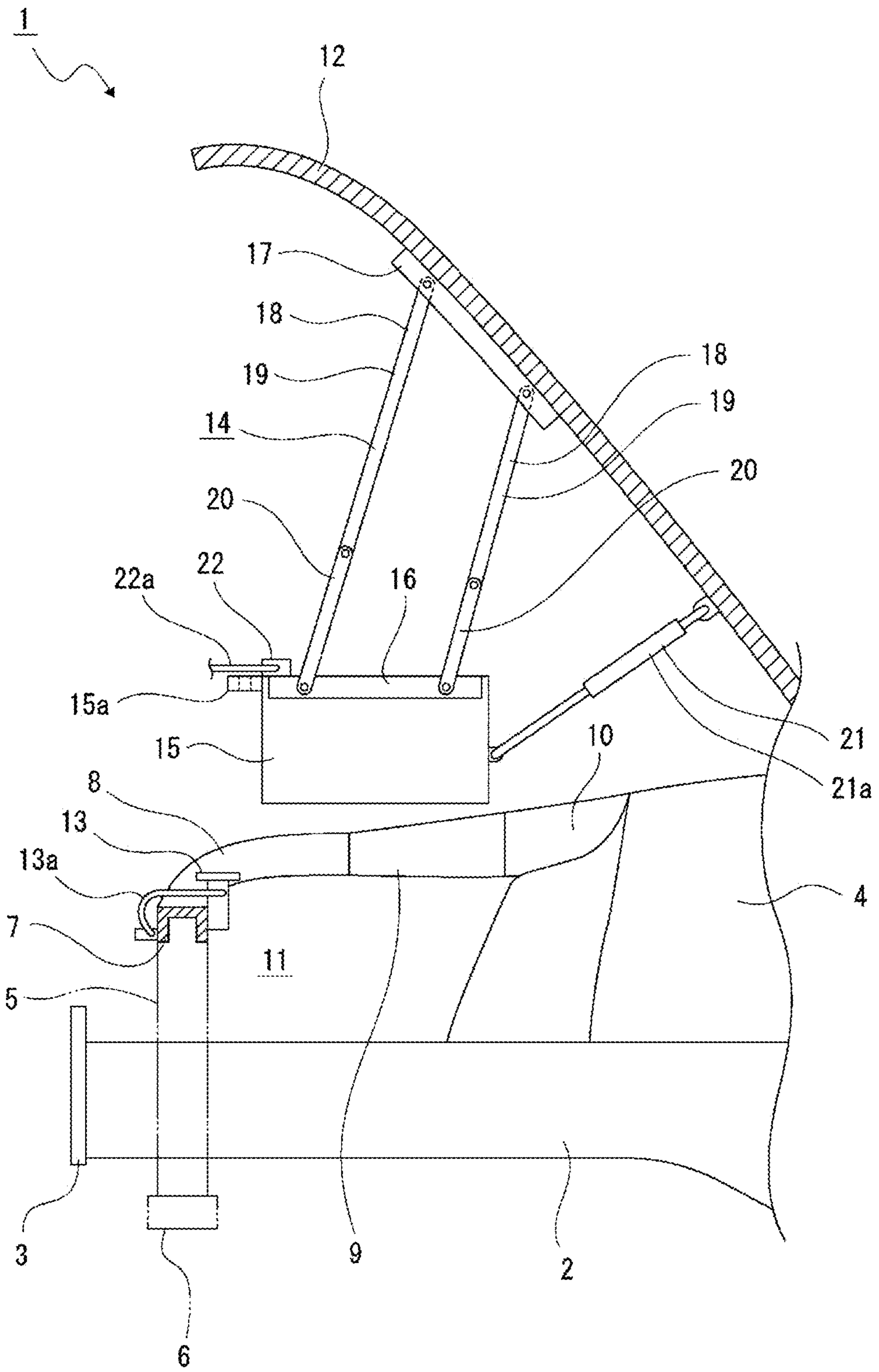
FIG. 5 is a side view illustrating a part of the vehicle front structure in a state where a frunk is moved to a working position.

Thus, the frunk 15 is moved downward relative to the hood 12, but is moved upward with the hood 12, and is pushed out forward by the damper 21, so that the frunk 15 is moved forward and upward to the working position with respect to the housing position (see FIG. 5). In the working position, the link mechanism 14 and the damper 21 are balanced, and the frunk 15 is held at the working position in a stable state.

Note that the vehicle front structure 1 need not be provided with the damper 21. In this case, the operator grips the handle 15*a* of the frunk 15, which has been moved forward with the hood 12, and pulls the handle 15*a* forward in the state where the hood 12 is open. This operates the link mechanism 14 to move the frunk 15 to the working position.

Since the frunk 15 is positioned close to the upper half of the body of the operator at the working position, the operator can easily load and unload the stored item in and from the frunk 15 without bending down the waist. As described above, since the front end of the frunk 15 is positioned rearward of the front end of the hood 12 in the state where the hood 12 is fully opened, the entirety of the frunk 15 is covered by the hood 12 from above in the state where the hood 12 is open. This can prevent rainwater from entering the inside of the frunk 15.

Figure 6:
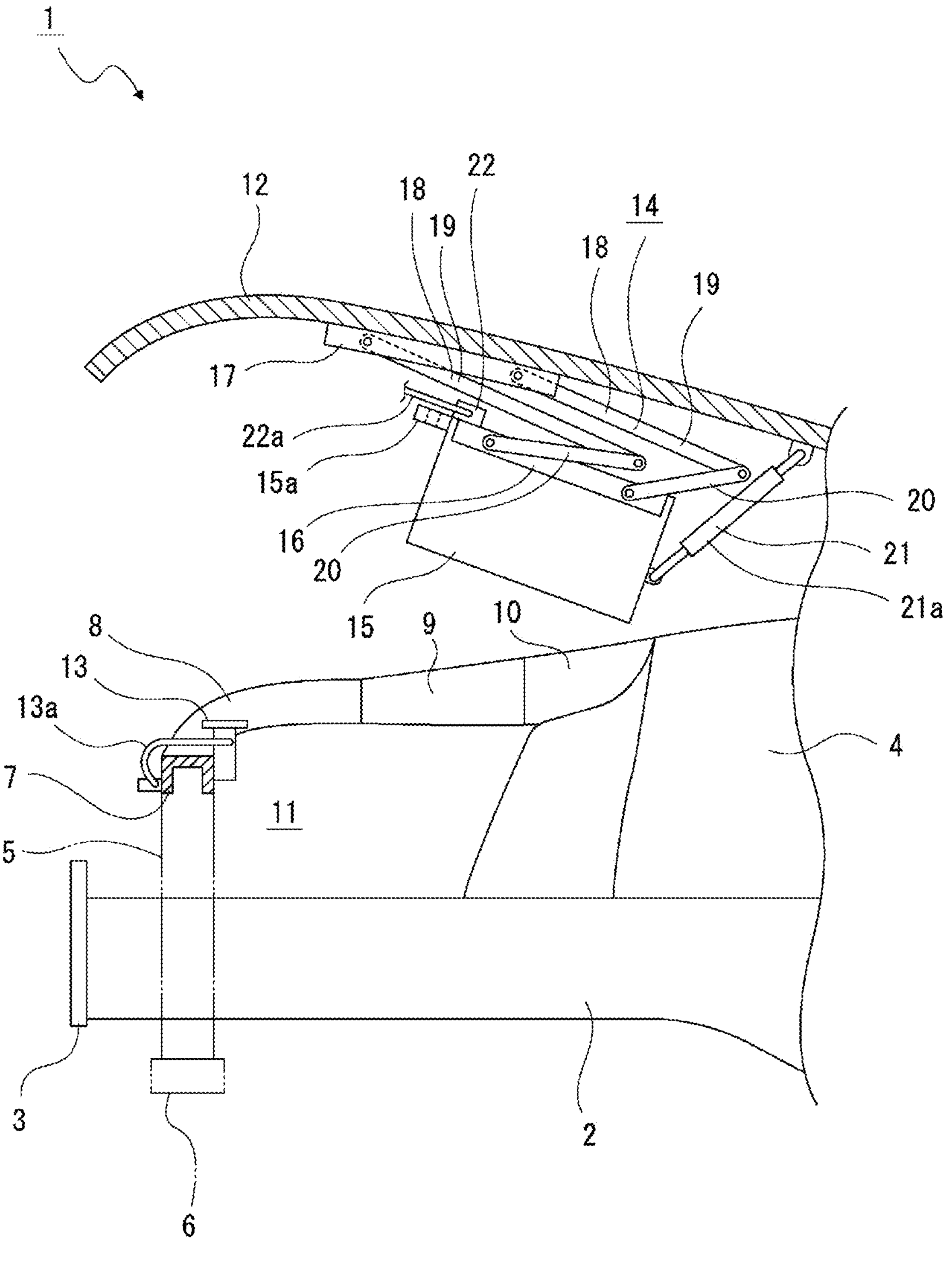
FIG. 6 is a side view illustrating a state where the frunk is locked to the hood by a frunk lock when the hood is open.

On the other hand, in a state where the hood 12 is open (fully opened state) or in the process of closing the hood 12 from the fully opened state, the frunk 15 is locked to the hood 12 by the frunk lock 22 by manually lifting the frunk 15 (see FIG. 6). When the hood 12 is closed in a state where the frunk 15 is locked to the hood 12, the frunk 15 is moved to the housing position and is accommodated in the housing space 11.

Although the example is described above in which the working position is a position on the upper side of and the front side of the housing position, in the vehicle front structure 1, the working position may be a position at least on the front side of the housing position, and for example, the working position and the housing position may be at the same height.

Figure 7:
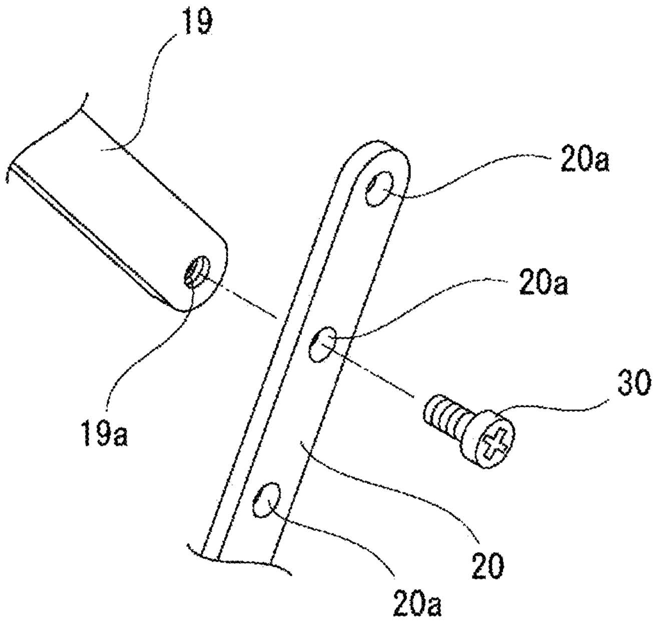
FIG. 7 is an exploded perspective view illustrating an adjustment structure provided in a link mechanism.
Figure 8:
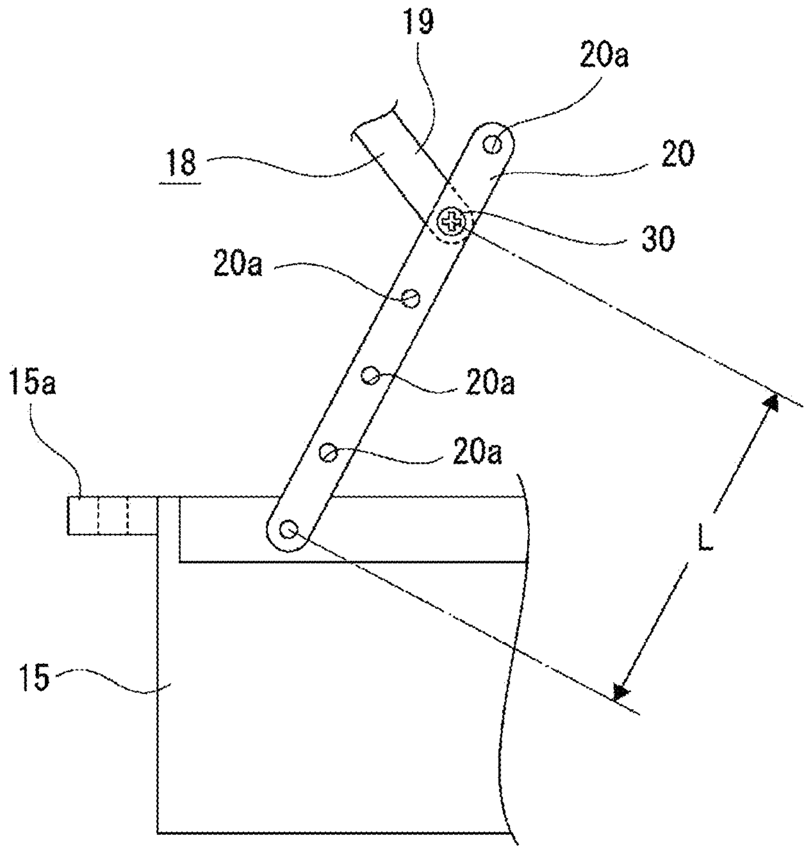
FIG. 8 is a side view illustrating a state where the height of the frunk is adjusted by the adjustment structure provided in the link mechanism.

The link mechanism 14 described above may be provided with the following adjustment structure (see FIGS. 7 and 8).

The adjustment structure includes, for example, a screw hole 19*a* formed at the lower end of the first link 19 in the arm 18 and adjustment holes 20*a* formed at the second link 20 in the arm 18 spaced apart in the longitudinal direction (see FIG. 7).

The adjustment is performed by, for example, inserting an adjustment bolt 30 into any adjustment holes 20*a* and screwing the adjustment bolt 30 into the screw hole 19*a* to couple the first link 19 and the second link 20. By the adjustment, a length L in the second link 20 from the lower end to the coupling portion with the first link 19 is changed (see FIGS. 7 and 8). Thus, the height of the frunk 15 attached to the link mechanism 14 at the working position is adjusted, and the operator can load and unload the stored item to and from the frunk 15 at a desired height.

By providing the above-described adjustment structure in the link mechanism 14, the height of the frunk 15 at the working position can be adjusted to a desired position in accordance with the height of the operator, the size of the stored item, and the like. This improves workability when the stored item is loaded and unloaded to and from the frunk 15.

In the example described above, the screw hole 19*a* is formed at the first link 19 and the adjustment holes 20*a* are formed at the second link 20. However, conversely, the adjustment holes may be formed at the first link and the screw hole may be formed at the second link. In addition, in the adjustment structure, the first link 19 or the second link 20 does not necessarily need to include the screw hole, and any configuration can be used as long as the position of the coupling portion between the first link 19 and the second link 20 can be changed.

<Conclusion>

As described above, the vehicle front structure 1 includes the link mechanism 14 attached to the hood 12 and the frunk 15 attached to the link mechanism 14 and accommodated in the housing space 11 in the state where the hood 12 is closed. The frunk 15 is movable at least in the front-rear direction according to the operation of the link mechanism 14 and is movable forward in the state where the hood 12 is open.

Thus, since the frunk 15 is movable forward in the state where the hood 12 is open, the stored item can be loaded and unloaded by moving the frunk 15 forward, which improves the convenience of loading and unloading the stored item to and from the frunk 15.

In addition, since the frunk 15 is accommodated above the drive motor 110 at the housing position, the drive motor 110 is not subjected to impact from the frunk 15 in the event of a collision of the vehicle 100, and the safety in the vehicle 100 can be ensured.

Further, the frunk 15 is movable upward when the hood 12 is opened.

Thus, since the frunk 15 is movable obliquely forward and upward when the hood 12 is opened, the stored item can be easily loaded to and unloaded from the frunk 15 without bending down the waist, which can improve usability.

Furthermore, the hood lock 13 for holding the hood 12 in the closed state and the frunk lock 22 for locking the frunk 15 to the hood 12 are provided, and locking of the frunk 15 by the frunk lock 22 is released when locking of the hood 12 by the hood lock 13 is released.

Thus, since the frunk 15 is unlocked to the hood 12 at the same time when the hood 12 is opened to use the frunk 15, it is not necessary to operate the frunk lock 22 to unlock the frunk 15, and this makes it possible to quickly load and unload the stored item to and from the frunk 15, which can improve usability.

In addition, the frunk 15 is coupled to the hood 12 by the damper 21, and when the hood 12 is opened, the force is applied to the frunk 15 in the direction of being moved forward by the damper 21.

Thus, since the frunk 15 is pushed out forward by the force applied from the damper 21 when the hood 12 is opened, the frunk 15 is moved forward without depending on the manual operation when the hood 12 is opened, thereby improving workability and speeding up the work relating to loading and unloading the stored item to and from the frunk 15.

The invention claimed is:

1. A vehicle front structure comprising:
- a hood configured to open and close a housing space in which at least a drive motor is disposed;
- a link mechanism attached to the hood;
- a frunk attached to the link mechanism and accommodated in the housing space in a state where the hood is closed;
- a hood lock configured to hold the hood in a closed state; and
- a frunk lock configured to lock the frunk to the hood, wherein
- the frunk is configured to move at least in a front-rear direction according to an operation of the link mechanism and is configured to move forward in a state where the hood is open, and
- locking of the frunk by the frunk lock is released when locking of the hood by the hood lock is released.

2. The vehicle front structure according to claim 1, wherein
- the frunk is configured to move upward when the hood is opened.

3. The vehicle front structure according to claim 1, wherein
- the frunk is coupled to the hood by a damper, and
- the damper is configured to, when the hood is opened, apply a force to the frunk in a direction by which the frunk is moved forward.

4. The vehicle front structure according to claim 1, wherein
- a front end of the frunk is configured to be positioned rearward of a front end of the hood in a state where the hood is fully open.

5. The vehicle front structure according to claim 2, wherein
- a front end of the frunk is configured to be positioned rearward of a front end of the hood in a state where the hood is fully open.

6. The vehicle front structure according to claim 3, wherein
- a front end of the frunk is configured to be positioned rearward of a front end of the hood in a state where the hood is fully open.

7. The vehicle front structure according to claim 1, further comprising
- an adjustment structure configured to adjust a position of the frunk in a state where the frunk being is forward.

8. The vehicle front structure according to claim 2, further comprising
- an adjustment structure configured to adjust a position of the frunk in a state where the frunk being is forward.

9. The vehicle front structure according to claim 3, further comprising
- an adjustment structure configured to adjust a position of the frunk in a state where the frunk being is forward.

* * * * *